United States Patent
Jin et al.

(10) Patent No.: US 10,889,497 B2
(45) Date of Patent: Jan. 12, 2021

(54) SHEET-SHAPED NITROGEN-PHOSPHORUS CO-DOPED POROUS CARBON MATERIAL AND METHOD FOR PREPARATION THEREOF AND USE THEREOF

(71) Applicant: Wenzhou University, Zhejiang (CN)

(72) Inventors: Huile Jin, Zhejiang (CN); Shun Wang, Zhejiang (CN); Meng Liu, Zhejiang (CN); Xiaochun Yu, Zhejiang (CN); Jichang Wang, Zhejiang (CN); Xiaomei Dong, Zhejiang (CN); Chao Yang, Zhejiang (CN); Cheng Feng, Zhejiang (CN)

( * ) Notice: Subject to any disclaimer, the term of this patent is extended or adjusted under 35 U.S.C. 154(b) by 98 days.

(21) Appl. No.: 16/082,545

(22) PCT Filed: Aug. 30, 2017

(86) PCT No.: PCT/CN2017/099650
§ 371 (c)(1),
(2) Date: Sep. 6, 2018

(87) PCT Pub. No.: WO2018/103386
PCT Pub. Date: Jun. 14, 2018

(65) Prior Publication Data
US 2019/0055127 A1    Feb. 21, 2019

(30) Foreign Application Priority Data
Dec. 7, 2016    (CN) .......................... 2016 1 1115117

(51) Int. Cl.
*H01B 1/00*    (2006.01)
*C01B 32/00*    (2017.01)
(Continued)

(52) U.S. Cl.
CPC .............. *C01B 32/05* (2017.08); *H01B 1/00* (2013.01); *H01G 11/24* (2013.01); *H01G 11/32* (2013.01);
(Continued)

(58) Field of Classification Search
CPC .... H01B 1/00; H01B 1/04; C09D 5/24; C01B 32/05; H01G 11/30
See application file for complete search history.

(56) References Cited

U.S. PATENT DOCUMENTS 10,010,866 B1 *    7/2018   Rana ...................... B01J 37/084
2014/0353144 A1 *  12/2014  Nakanishi ............... C25B 11/03
                                                        204/252

FOREIGN PATENT DOCUMENTS

CN    102583312 A    7/2012
CN    105439115 A    3/2016
(Continued)

OTHER PUBLICATIONS

International Search Report dated Nov. 27, 2017 in corresponding Applicaiton No. PCT/CN2017/099650; 3 pages.

*Primary Examiner* — Mark Kopec

(57) ABSTRACT

Provided is a sheet-shaped nitrogen-phosphorus co-doped porous carbon material, prepared and obtained according to the following method: mixing aniline and hexachlorocyclotriphosphazene, undergoing a closed reaction for 2-24 h at a pressure of 1-10 MPa and a temperature of 140-260° C., then pressure is released to atmospheric pressure and steam drying is performed to obtain a solid substance; under inert gas protection, the obtained solid substance is treated for 1-6 h at a high temperature of 400-1000° C., and the finished product is obtained; the sheet-shaped nitrogen-phosphorus co-doped porous carbon material thus provided has excellent electrical properties and may be used for fabricating capacitor electrodes and especially supercapacitor electrodes; thus (Continued)

it may be used in capacitors and especially supercapacitors, and has great application potential and industrial value in the field of energy storage.

9 Claims, 5 Drawing Sheets

(51) Int. Cl.
*H01G 11/00* (2013.01)
*C01B 32/05* (2017.01)
*H01G 11/24* (2013.01)
*H01G 11/32* (2013.01)
*H01G 11/86* (2013.01)

(52) U.S. Cl.
CPC .......... *H01G 11/86* (2013.01); *C01P 2002/52* (2013.01); *C01P 2002/72* (2013.01); *C01P 2004/03* (2013.01); *C01P 2004/20* (2013.01); *C01P 2006/40* (2013.01); *Y02E 60/13* (2013.01)

(56) References Cited

FOREIGN PATENT DOCUMENTS

| CN | 105523541 A | | 4/2016 |
|----|-------------|---|--------|
| CN | 105621390 A | | 6/2016 |
| CN | 105692580 A | | 6/2016 |
| CN | 105752961 A | * | 7/2016 |
| CN | 106000438 A | * | 10/2016 |
| CN | 106006549 A | | 10/2016 |
| CN | 106744794 A | | 5/2017 |
| WO | 2008068410 A3 | | 7/2008 |
| WO | 2015194142 A1 | | 12/2015 |

* cited by examiner

SHEET-SHAPED NITROGEN-PHOSPHORUS CO-DOPED POROUS CARBON MATERIAL AND METHOD FOR PREPARATION THEREOF AND USE THEREOF

FIELD OF THE INVENTION

The invention provides a sheet-shaped nitrogen-phosphorus co-doped porous carbon material which can be used for supercapacitors, and a method for preparation thereof and use thereof, belongs to inorganic functional material field.

BACKGROUND

Energy is an important material basis that supports people's lives and socioeconomic development. In the early 21st century, on the one hand, with the large-scale use of fossil energy, traditional energy has become increasingly exhausted; on the other hand, with the advancement of modern science and technology, people's demands and requirements for energy are increasing, so there is a serious contradiction between people's growing energy needs and the shortage of energy supply. Therefore, there is no doubt that energy storage and conversion is one of the major challenges for people in the 21st century. Supercapacitors are a class of power-type energy storage equipment with fast charge-discharge capability, compared with traditional capacitors, they have high power density and energy density, and have broad application prospects for power equipment of hybrid electric vehicles. Therefore, further improving the properties of supercapacitors is of great significance to meet the energy storage requirements of people in the 21st century.

It is generally acknowledged that functional groups can be introduced on the surface of the material with the heteroatom doping of porous carbon electrode material, which is beneficial to adsorbing electrolyte ions, further improving the hydrophobic or hydrophilic of the carbon materials, enhancing the wettability of the electrode materials, and enhancing the rapid transfer of electrolyte ions in the microporous of materials. Simultaneously, the heteroatom functional groups on the surface of the carbon materials make the materials have acidic or alkaline active sites, and a Faraday oxidation-reduction reaction occurs between the active sites and the electrolyte ions, thereby pseudocapacitance is generated to increase the specific capacitance of the electrode materials.

Most of the earlier studies focused on the research of single heteroatom doping, and the studies on the effects of multiple heteroatoms on the electrode materials property is relatively rare. The prior art for synthesizing sheet-shaped nitrogen-phosphorus co-doped porous carbon materials can be cited as follows:

CN105006375A discloses a preparation method of a nitrogen-phosphor co-doped porous carbon nanotube. The method includes the following steps: 1) preparing a carboxylation carbon nanotube; 2) preparing a melamine-phenolic resin wrapped carbon nanotube by taking melamine-resorcinol-presence of formaldehyde resin as a precursor; and 3) conducting phosphatization: mixing the melamine-phenolic resin wrapped carbon nanotube obtained from the step 2) with a phosphatization agent, dispersing the mixture in deionized water in an ultrasonic manner, drying the mixture, enabling the dried product to rise to 600-900° C. in an inert atmosphere and to be phosphatized for 120-180 min, naturally cooling the product to a room temperature, washing obtained black powder with water, performing pumping filtration until the powder is neutral, drying and finally obtaining the nitrogen-phosphor co-doped porous carbon nanotube. The prepared nitrogen-phosphor co-doped porous carbon nanotube enables the specific capacitance of a capacitor to be substantially increased.

CN105457666A discloses a preparation method and an application of a nitrogen-phosphorus co-doped porous carbon catalyst and belongs to the field of oxygen reduction catalysts for a fuel cell cathode. Nitrogen and phosphorus are introduced with an in-situ doping method, and the nitrogen and phosphorus doping amount is changed by adjusting the content of nitrogen and phosphorus precursor. Besides, nitrogen-phosphorus co-doped porous carbon is prepared with a hard template method, and controllability of pore diameters of the porous carbon is realized by adjusting a hard template. The method comprises steps as follows: an earlier polymer of aniline monomers, phosphorus precursor, silica-based hard template and non-precious metal salt is prepared; the earlier polymer is calcined, and solids are obtained; the solids are etched, cleaned and dried, and the carbon material is obtained. More importantly, the prepared nitrogen-phosphorus co-doped porous carbon material has an excellent oxygen reduction electro-catalytic property under the acid condition and has huge application potential.

CN104201001A discloses a rod-shaped nitrogen-phosphorus co-doping mesoporous carbon material and a preparation method and application thereof. The rod-shaped nitrogen-phosphorus co-doping mesoporous carbon material is of a mesoporous structure and comprises the following components based on atomic percent: 23.70% to 33.85% of nitrogen content, 0.51% to 0.72% of phosphorus content, and the balance of carbon, the aperture is distributed from 1.74 to 1.95 nm, the specific surface area is about 585 to 1173 $cm^2/g$, the pore volume is 0.49 to 1.07 $cm^3/g$. The preparation method comprises the following steps: mixing and agitating rod-shaped mesoporous silica, organic high-molecular polymer, nitrogen-containing precursor, phosphorus-containing precursor and alcohol, in order to enable the carbon source, nitrogen source and phosphorus source to be fully dipped into a pore channel of mesoporous silica, drying until alcohol is completely volatilized to obtain a nitrogen source/phosphorus source/carbon phosphorus/silica composite, sequentially processing by high-temperature carbonizing, silica removing and drying to obtain the rod-shaped nitrogen-phosphorus co-doping mesoporous carbon material. The rod-shaped nitrogen-phosphorus co-doping mesoporous carbon material is applied to manufacturing of an electrode material for a supercapacitor.

CN104003368A discloses a porous phosphor-nitrogen co-doped carbon material and a preparation method thereof, and belongs to the field of carbon material. Through a chemical bonding method, phosphor atoms and nitrogen atoms are introduced into a porous carbon material, so that the carbon atoms in a six-membered carbon ring of the porous carbon material are replaced by the phosphor atoms and nitrogen atoms, and the functional porous carbon material is obtained. The preparation method comprises the following steps of: A, preparing a polymer from a nitrogen-containing conducting polymer, a phosphorus-containing organic matter, a silicon-based hard template and a metal catalyst; B, carrying out a hydrothermal reaction process to obtain a solid 1 and calcining the solid 1 to obtain a solid 2; and C, etching the solid 2 and carrying out cleaning to obtain the porous phosphor-nitrogen co-doped carbon material. The porous phosphor-nitrogen co-doped carbon material has high nitrogen and phosphor content, a high specific surface area and a high yield. The preparation method has simple processes and can be operated easily.

Technical Problem

Based on the defects and improvement directions of the prior supercapacitors, how to apply heteroatom co-doped carbon material to the field of supercapacitors is of great significance, and it is also one of the research hotspots and focuses in the field of inorganic material, which is also the foundation and motivation of the invention to be completed.

Means for Solving Problem

Technical Solution

The invention adopts the following technical scheme:

A sheet-shaped nitrogen-phosphorus co-doped porous carbon material, is prepared and obtained according to the following method:

(1) mixing aniline and hexachlorocyclotriphosphazene, undergoing a closed reaction for 2-24 h at a pressure of 1-10 MPa and a temperature of 140-260° C., then pressure is released to atmospheric pressure (0.1 MPa) and steam drying (that is vaporizing and eliminating extra aniline) is performed to obtain a solid substance;

the volume of the aniline is 3-300 mL/g by the mass of the hexachlorocyclotriphosphazene, preferably from 10 to 200 mL; the reaction pressure is preferably 1-3 MPa; the reaction temperature is preferably 180-220° C., and the most preferably 200° C.; the reaction time is preferably 2-10 h;

(2) under inert gas protection, the obtained solid substance in step (1) is treated for 1-6 h at a high temperature of 400-1000° C., and the sheet-shaped nitrogen-phosphorus co-doped porous carbon material is obtained;

the inert gas is nitrogen or argon; the temperature of the high-temperature treatment is preferably 800-1000° C., and the most preferably 900° C.; the time of the high-temperature treatment is preferably 2-5 h.

The sheet-shaped nitrogen-phosphorus co-doped porous carbon material of the invention has excellent electrical properties, and can be applied into the field of capacitors, especially into the supercapacitors field, and has excellent application prospects and industrial potential. Specifically, the sheet-shaped nitrogen-phosphorus co-doped porous carbon material of the invention can be applied for preparing capacitor electrodes, wherein the application method is:

mixing the sheet-shaped nitrogen-phosphorus co-doped porous carbon materials, acetylene black, PTFE (polytetrafluoroethylene) emulsion and nitromethylpyrrolidone uniformly, stirring to starchiness and coating on the foamed nickel (1-8 mg/cm$^2$), and then desiccating, drying and preforming the coated foamed nickel to obtain capacitor electrodes;

The mass ratio of the sheet-shaped nitrogen-phosphorus co-doped porous carbon materials, acetylene black and PTFE (polytetrafluoroethylene) emulsion is 80:10:10;

the PTFE (polytetrafluoroethylene) emulsion is a public material commonly used in the field of capacitor electrode fabrication and is commercially available through various channels;

the amount of the nitromethylpyrrolidone is not particularly limited in the invention, and the amount thereof is a conventional technique in the field of capacitors, and persons skilled in the art can make a suitable choice;

the operations for desiccating, drying and preforming the coated foamed nickel are also a conventional technique in the field of capacitors, therefore, the disclosure is not covered the details thereof.

The capacitor electrodes prepared and obtained from the sheet-shaped nitrogen-phosphorus co-doped porous carbon materials of the invention have excellent electrochemical properties, such as large storage capacity, high power, long life, low cost, friendly environment, etc., and can be applied into the field of capacitors, especially into the supercapacitors field.

Advantageous Effects of the Invention

Advantageous Effects

The invention has the advantageous effects that: the sheet-shaped nitrogen-phosphorus co-doped porous carbon materials provided by the invention have excellent electrical properties, such as a high current charge-discharge capability (the capacitance is 122.2 F/g when the current density is 80 A/g), great cycle stability (the capacity is almost no attenuation after 35,000 cycles), and can be applied for preparing capacitor electrodes, especially supercapacitors, thereby, it can be applied into the field of capacitors, especially into the supercapacitors field, and has excellent application prospects and industrial potential in the field of energy storage.

BRIEF DESCRIPTION OF THE DRAWINGS

Description of the Drawings

Figure 1:
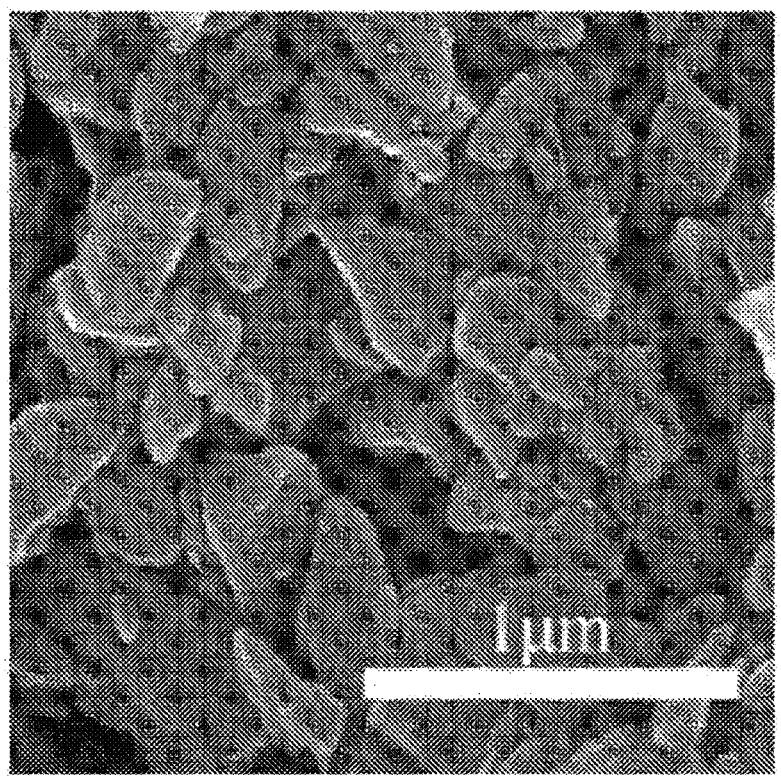
Figure 2:
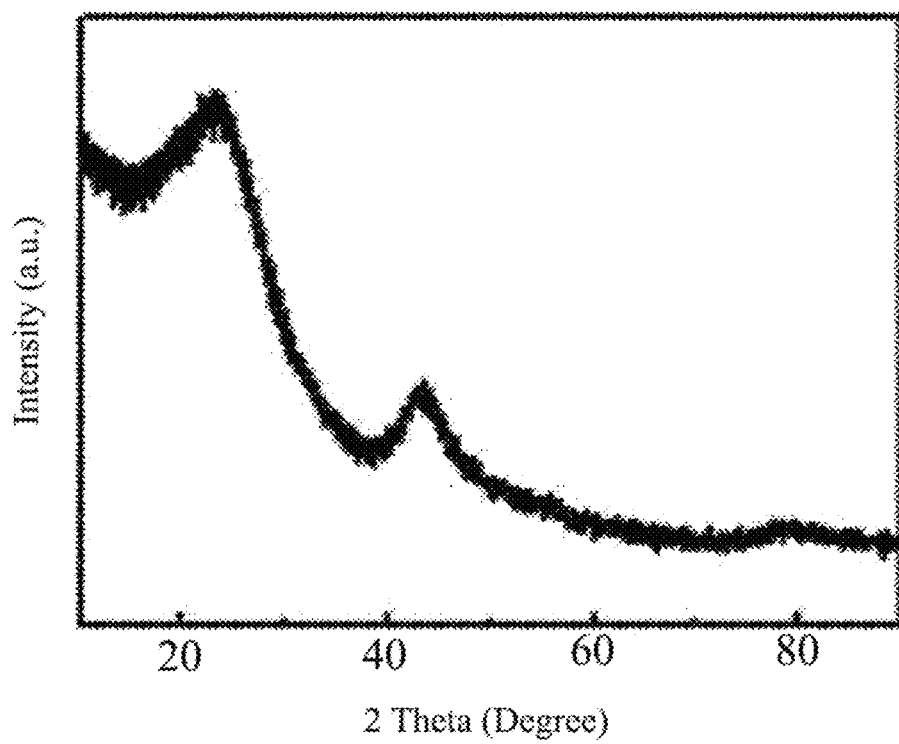
Figure 3:
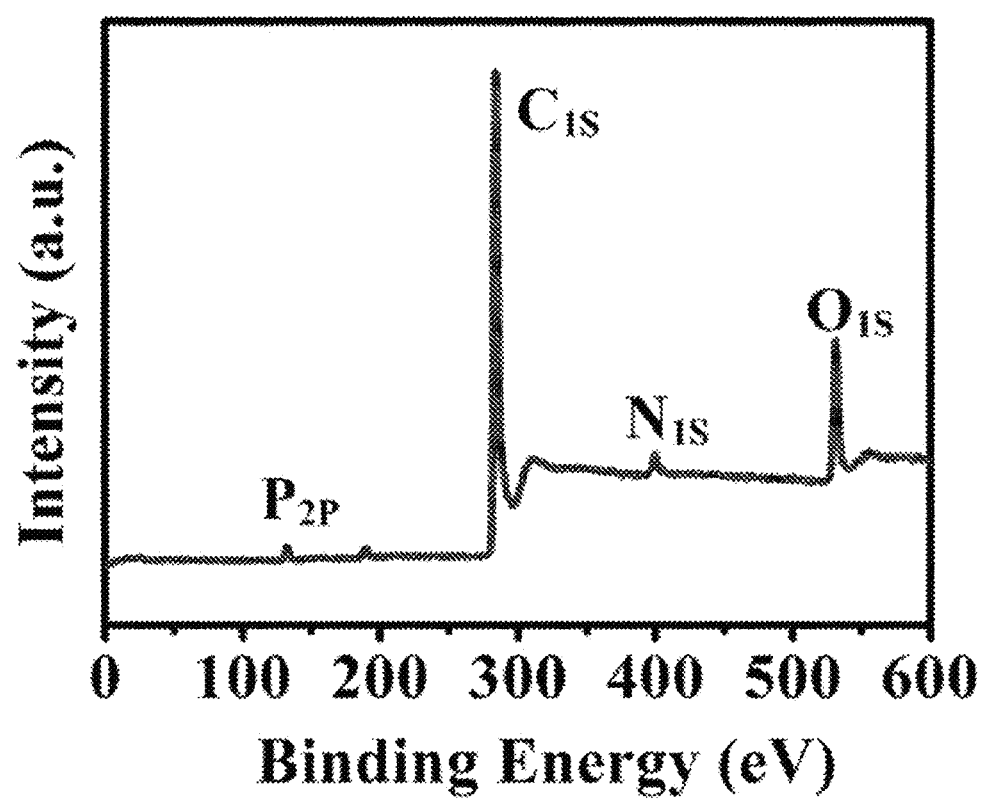
Figure 4:
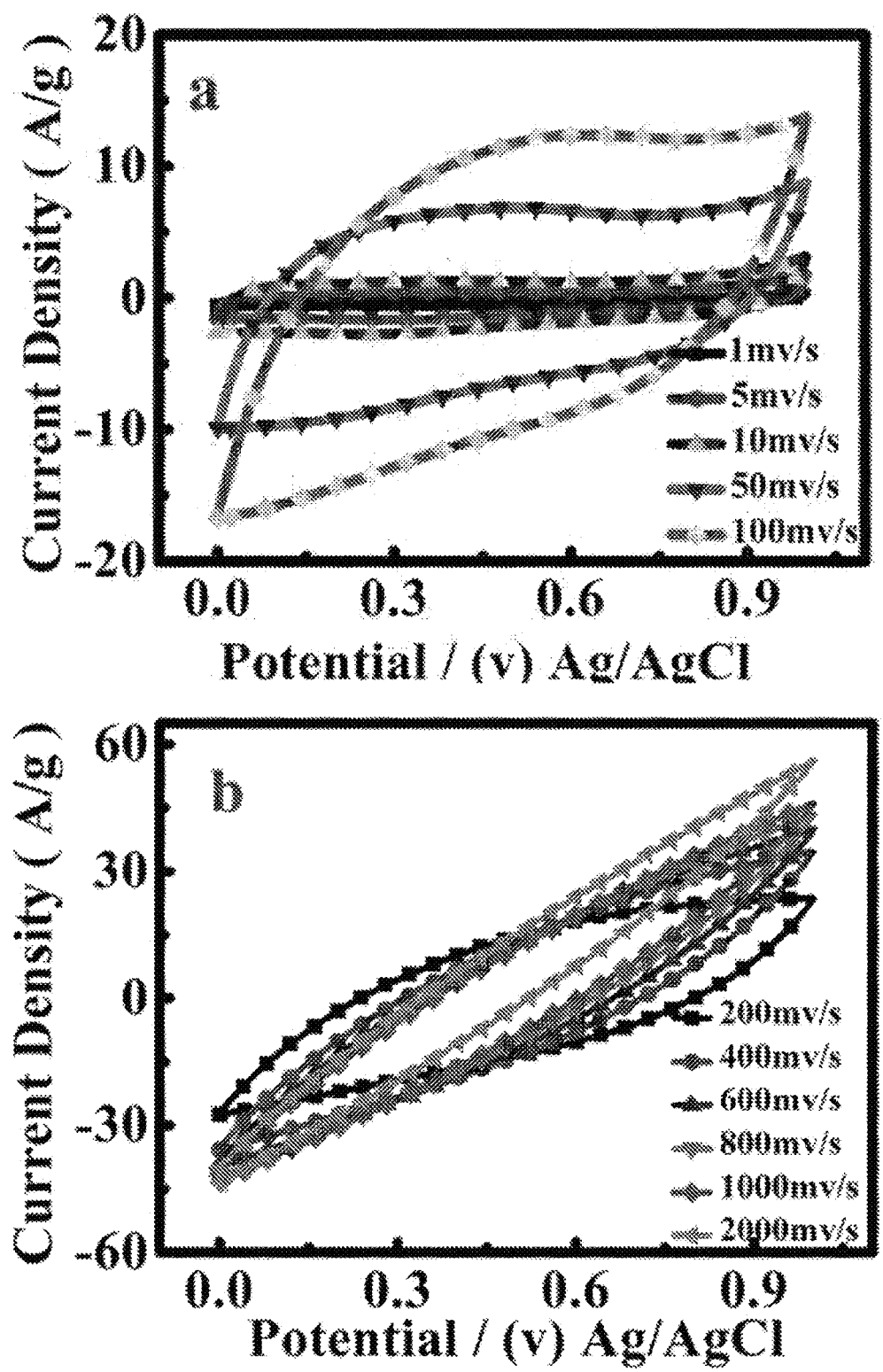
Figure 5:
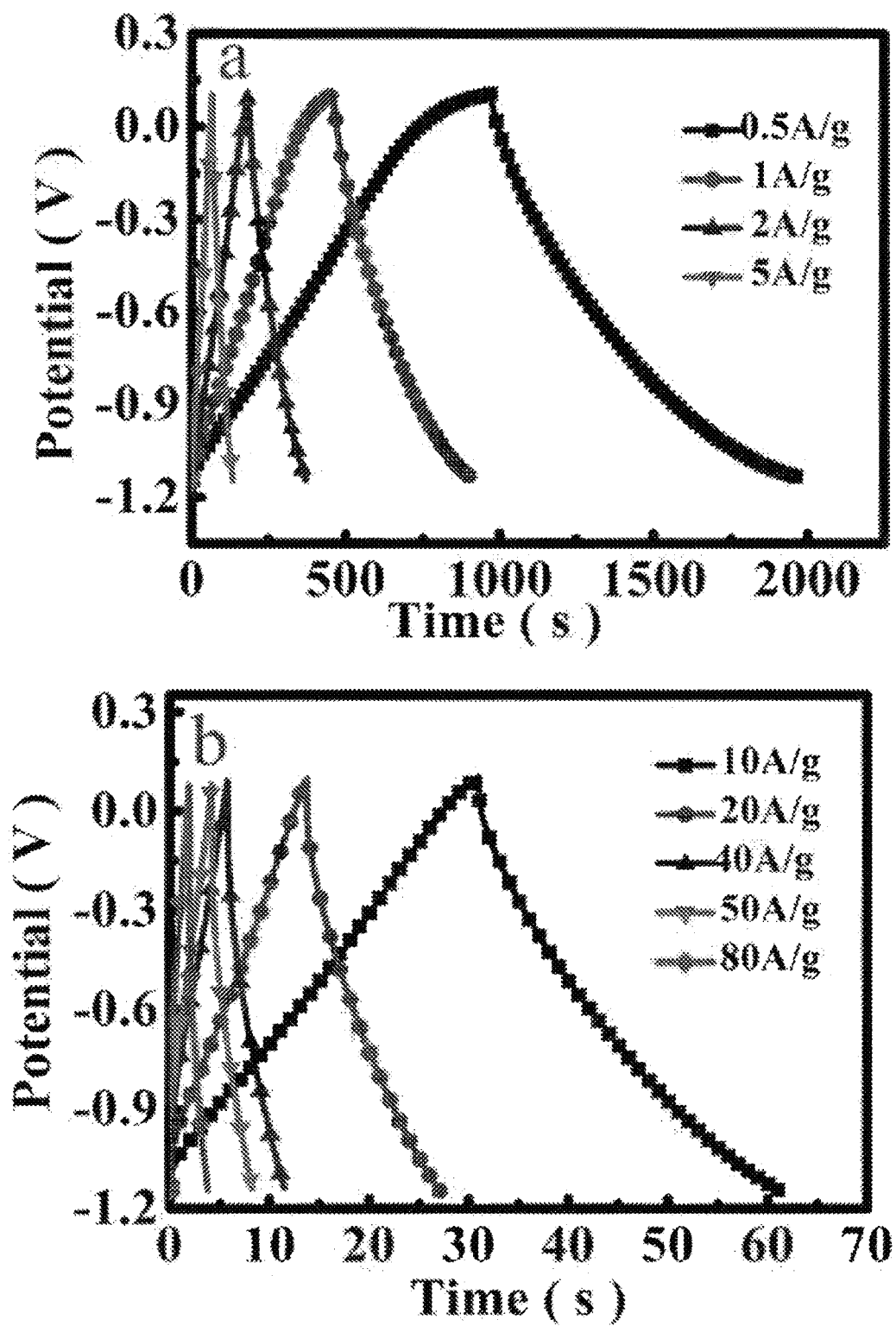
Figure 6:
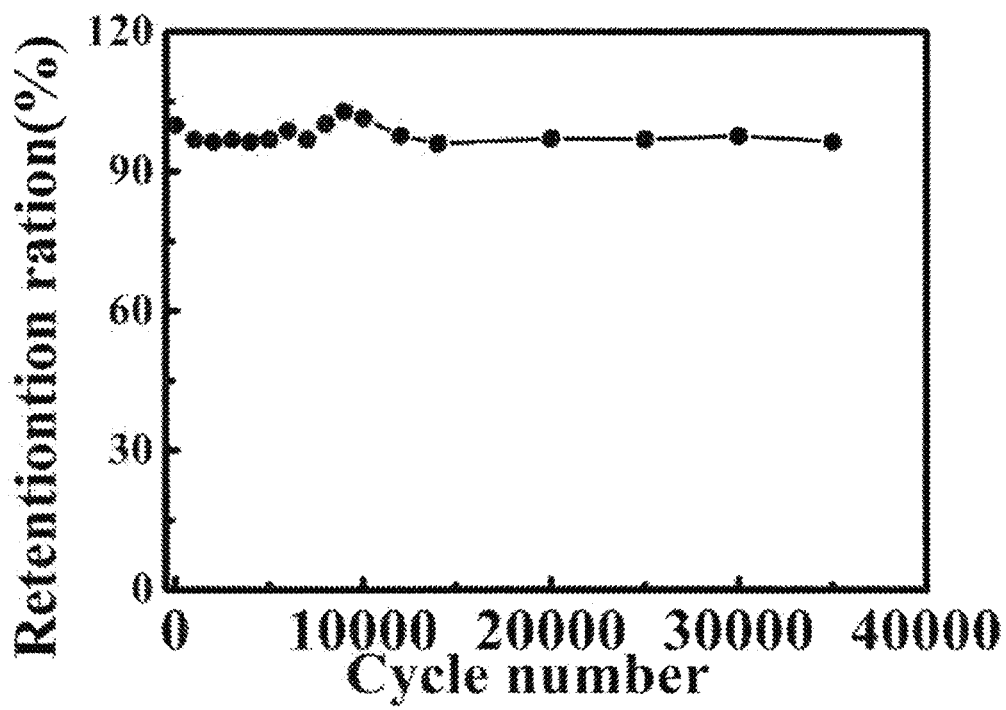
Figure 7:
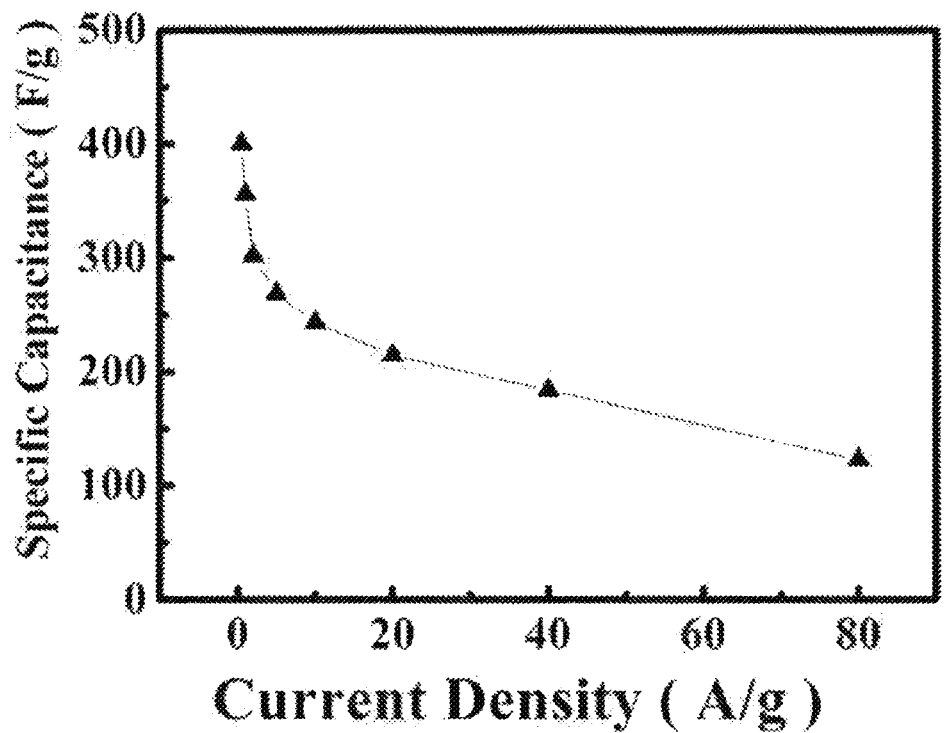

FIG. 1: a scanning electron microscope (SEM) diagram showing the sheet-shaped nitrogen-phosphorus co-doped porous carbon materials obtained in Embodiment 1;

FIG. 2: a XRD diagram showing the sheet-shaped nitrogen-phosphorus co-doped porous carbon materials obtained in Embodiment 1;

FIG. 3: a XPS diagram showing the sheet-shaped nitrogen-phosphorus co-doped porous carbon materials obtained in Embodiment 1;

FIG. 4: the cyclic voltammograms showing the capacitor electrodes obtained in Embodiment 11 at different scan rates, wherein (a) is cyclic voltammogram at a scan rate of 1-100 mv/s, and (b) is cyclic voltammogram at a scan rate of 200-2000 mv/s;

FIG. 5: the constant-current charge-discharge diagrams showing the capacitor electrodes obtained in Embodiment 11 at different current densities, wherein (a) is constant-current charge-discharge diagram with a current density of 0.5 to 5 $Ag^{-1}$, and (b) is constant-current charge-discharge diagram with a current density of 10~80 $Ag^{-1}$;

FIG. 6: a diagram showing the cycle stability of the capacitor electrodes obtained in Embodiment 11 at different current densities;

FIG. 7: a Ragone plot showing the cycle stability of the capacitor electrodes obtained in Embodiment 11 at different current densities.

THE PREFERRED EMBODIMENTS OF THE INVENTION

Description of the Preferred Embodiments (1) mixing 30 ml of aniline and 0.17 g of hexachlorocyclotriphosphazene, undergoing a closed reaction for 5 h at a pressure of 2 MPa and a temperature of 200° C., then pressure is released to atmospheric pressure and steam vaporizing and eliminating extra aniline to obtain a solid substance;

(2) under inert nitrogen protection, the obtained solid substance in step (1) is treated for 2 h at a high temperature of 900° C., and the sheet-shaped nitrogen-phosphorus co-doped porous carbon material is obtained.

Weighing 30 mg of the sheet-shaped nitrogen-phosphorus co-doped porous carbon materials, 0.375 mg of acetylene black and 0.375 mg of PTFE (polytetrafluoroethylene) emulsion (Purchased from Shanghai Aladdin Reagent Co., Ltd.) prepared in Embodiment 1, the mass ratio thereof is 80:10:10, adding 2 g of nitromethylpyrrolidone and mixing uniformly, stirring to starchiness and coating on the foamed nickel (size 1×1 cm) at a coating amount of 3 mg/cm$^2$, and then desiccating, drying and preforming the coated foamed nickel to obtain capacitor electrodes.

The properties of the sheet-shaped nitrogen-phosphorus co-doped porous carbon materials and the capacitor electrodes obtained in the above embodiment are characterized as follows, thereby demonstrating that the treatment temperature in the step (2) was preferably at 900° C.

DETAILED DESCRIPTION OF THE INVENTION

Embodiments of the Invention

The invention is described in detail below with reference to the specific embodiments thereof, but the embodiments are not intended to limit the scope of the invention, and the scope of the invention is not limited thereto.

Embodiment 1

(1) mixing aniline of 30 ml and hexachlorocyclotriphosphazene of 0.17 g, undergoing a closed reaction for 5 h at a pressure of 2 MPa and a temperature of 200° C., then pressure is released to atmospheric pressure and steam vaporizing and eliminating extra aniline to obtain a solid substance;

(2) under inert nitrogen protection, the obtained solid substance in step (1) is treated for 2 h at a high temperature of 900° C., and the sheet-shaped nitrogen-phosphorus co-doped porous carbon material is obtained, named C1.

Embodiments 2 to 7: Investigation of Reaction Temperature in Step (1)

Except that the reaction temperatures in step (1) are replaced by 180° C., 220° C., 160° C., 240° C., 140° C., and 260° C., respectively, other operations are unchanged, thereafter Embodiments 2 to 7 are sequentially performed, and named C2 to C7, respectively.

Embodiments 8 to 10: Investigation of the Temperature of the High-Temperature Treatment in Step (2)

Except that the temperatures of the high-temperature treatment in step (2) are replaced by 800° C., 900° C., and 1000° C., respectively, other operations are unchanged, thereafter Embodiments 8 to 10 are sequentially performed, and named C8 to C10, respectively.

Embodiment 11: The Preparation Method of Capacitor Electrodes

Weighing 30 mg of the sheet-shaped nitrogen-phosphorus co-doped porous carbon materials, 0.375 mg of acetylene black and 0.375 mg of PTFE (polytetrafluoroethylene) emulsion (Purchased from Shanghai Aladdin Reagent Co., Ltd.) prepared in Embodiment 1, the mass ratio thereof is 80:10:10, adding 2 g of nitromethylpyrrolidone and mixing uniformly, stirring to starchiness and coating on the foamed nickel (size 1×1 cm) at a coating amount of 3 mg/cm$^2$, and then desiccating, drying and preforming the coated foamed nickel to obtain capacitor electrodes.

The properties of the sheet-shaped nitrogen-phosphorus co-doped porous carbon materials and the capacitor electrodes obtained in the above embodiments are characterized as follows.

(I) Microscopic characterization of the sheet-shaped nitrogen-phosphorus co-doped porous carbon materials obtained in Embodiment 1.

The sheet-shaped nitrogen-phosphorus co-doped porous carbon materials obtained in Embodiment 1 are microscopically characterized by various means, and the results are as follows:

FIG. 1 is a scanning electron microscope (SEM) diagram showing the sheet-shaped nitrogen-phosphorus co-doped porous carbon materials obtained in Embodiment 1, wherein the materials are sheet-shaped.

FIG. 2 is a XRD diagram showing that the sheet-shaped nitrogen-phosphorus co-doped porous carbon material is an amorphous structure, which is more conducive to the rapid embedding and derivation of ions or protons, and suitable for electrode materials.

FIG. 3 is a XPS diagram showing that the sheet-shaped nitrogen-phosphorus co-doped porous carbon material contains carbon, nitrogen, phosphorus and oxygen.

(II) Electrochemical Properties Testing

FIG. 4 is the cyclic voltammograms showing the capacitor electrodes obtained in Embodiment 11 at different scan rates.

In FIG. 4, the rate of each closed curve from top to below from left side (ie, arranged downward from the highest point of the left half) is 1 mv/s, 5 mv/s, 10 mv/s, 50 mv/s, 100 mv/s, 200 mv/s, 400 mv/s, 600 mv/s, 800 mv/s, 1000 mv/s and 2000 mv/s respectively. As can be seen therefrom, the material still has a good pattern at a rate of 100 mv/s, and the capacity is formula calculated 188.7 F/g at the rate of 100 mv/s.

FIG. 5 is the constant-current charge-discharge diagrams showing the capacitor electrodes obtained in Embodiment 11 at different current densities.

In the left figure of FIG. 5, the current densities from right to left are 0.5 A/g, 1 A/g, 2 A/g, and 5 A/g, respectively; in the right figure thereof, the current densities from right to left are 10 A/g, 20 A/g, 40 A/g, 50 A/g and 80 A/g, respectively.

The constant-current charge-discharge diagram shows that calculated capacitance is still 122.2 F/g when the material is charged and discharged at a current density of 80 A/g, and the calculated capacitance is 400.5 F/g at a current density of 0.5 A/g, thereby demonstrating that the material can be charged and discharged at a large current density and has excellent charge-discharge property.

FIG. 6 shows a diagram of the cycle stability of the capacitor electrodes obtained in Embodiment 11 at different current densities, as can be seen therefrom, the material has excellent cycle stability at high current densities; the material shows almost no attenuation after 35,000 cycles, thereby showing excellent cycle stability.

FIG. 7 is a Ragone plot showing the capacitor electrodes obtained in Embodiment 11 at different current densities. As can be seen therefrom, at a current density of 0.5 A/g (top triangle), the materials have an energy density of 85.4 Wh/kg; at a current density of 80 A/g (top triangle), the materials have an power density of 49.9 kW/kg. Compared with published nitrogen-phosphorus co-doped porous carbon materials, the material of the invention has higher energy density and power density.

As can be seen in FIGS. 4-7, the sheet-shaped nitrogen-phosphorus co-doped porous carbon materials of the invention have excellent electrochemical properties, and can be applied into the field of capacitors, especially into the supercapacitors field, and have excellent application prospects and industrial potential.

Microscopic characterization of composite materials obtained in Embodiments 2 to 7, and 8 to 10.

A. The characterization of C2-C7 found that the microscopic morphology thereof is highly similar to that of C1, and the electrochemical property thereof is also highly similar to that of C1. However, due to the high degree of similarity and for the sake of brevity, all diagrams of microscopic characterization and electrochemical property are not listed in the disclosure.

B. From the characterization of C8~C10, it is found that the microscopic morphology thereof is highly similar to that of C1, and the electrochemical property thereof is lower than that of C1; Table 1 below shows the capacitance of 100 mv/s at different temperatures of the high-temperature treatment, thereby demonstrating that the treatment temperature in step (2) was preferably at 900° C.

TABLE 1 the capacitance of 100 mv/s at different temperatures

| T (° C.) | C (F/g) |
|---|---|
| 800 | 29.88 |
| 900 | 188.7 |
| 1000 | 51.39 |

It is to be understood that the embodiments is merely to illustrate the invention and is not intended to limit the scope of the invention. In addition, it should be clear that various changes, modifications, and/or variations of the invention may be made by those skilled in the art after reading the technical content of the invention, all equivalent forms in the art without departing from the scope and spirit of the invention should still be covered by the appended claims of the invention.

INDUSTRIAL APPLICABILITY OF THE INVENTION

The invention synthesizes a sheet-shaped nitrogen-phosphorus co-doped porous carbon material by selecting suitable reactants and conditions. It is found through research that the composite material has excellent electrochemical property, and has great industrial application potential and market value.

The invention claimed is:

1. A sheet-shaped nitrogen-phosphorus co-doped porous carbon material, wherein prepared and obtained according to the following method:
   (1) mixing aniline and hexachlorocyclotriphosphazene, undergoing a closed reaction for 2-24 h at a pressure of 1-10 MPa and a temperature of 140-260° C., then pressure is released to atmospheric pressure and steam drying is performed to obtain a solid substance;
   the volume of the aniline is 3-300 mL/g by the mass of the hexachlorocyclotriphosphazene;
   (2) under inert gas protection, the obtained solid substance in step (1) is treated for 1-6 h at a high temperature of 400-1000, and the sheet-shaped nitrogen-phosphorus co-doped porous carbon material is obtained.

2. The sheet-shaped nitrogen-phosphorus co-doped porous carbon material of claim 1, wherein the volume of the aniline in step (1) is 10-200 mL/g by the mass of the hexachlorocyclotriphosphazene.

3. The sheet-shaped nitrogen-phosphorus co-doped porous carbon material of claim 1, wherein the reaction pressure in step (1) is 1-3 MPa.

4. The sheet-shaped nitrogen-phosphorus co-doped porous carbon material of claim 1, wherein the reaction temperature in step (1) is 180-220° C.

5. The sheet-shaped nitrogen-phosphorus co-doped porous carbon material of claim 1, wherein the reaction time is 2-10 h.

6. The sheet-shaped nitrogen-phosphorus co-doped porous carbon material of claim 1, wherein the temperature of the high-temperature treatment in step (2) is 800-1000° C.

7. The sheet-shaped nitrogen-phosphorus co-doped porous carbon material of claim 1, wherein the time of the high-temperature treatment in step (2) is 2-5 h.

8. A capacitor electrode or supercapacitor electrode formed by the method comprising using the sheet-shaped nitrogen-phosphorus co-doped porous carbon material of claim 1.

9. The capacitor electrode of claim 8, wherein the capacitor electrodes is prepared and obtained according to the following method: mixing the sheet-shaped nitrogen-phosphorus co-doped porous carbon material, acetylene black, PTFE emulsion and nitromethylpyrrolidone uniformly, stirring to starchiness and coating on the foamed nickel, the coating amount is 1-8 mg/cm$^2$, and then desiccating, drying and preforming the coated foamed nickel to obtain capacitor electrodes;
   the mass ratio of the sheet-shaped nitrogen-phosphorus co-doped porous carbon material, acetylene black and PTFE emulsion is 80:10:10.

* * * * *